Patented Feb. 5, 1924.

1,482,804

UNITED STATES PATENT OFFICE.

MATTHEW D. MANN, JR., OF ROSELLE, NEW JERSEY, ASSIGNOR TO SETH B. HUNT, TRUSTEE, OF MOUNT KISCO, NEW YORK.

ART OF MANUFACTURING ISOPROPYL ETHER.

No Drawing.   Application filed October 27, 1921.   Serial No. 510,821.

*To all whom it may concern:*

Be it known that I, MATTHEW D. MANN, Jr., a citizen of the United States, residing at 625 Locust Street, Roselle, in the county of Union and State of New Jersey, have invented a new and useful Improvement in the Art of Manufacturing Isopropyl Ether, of which the following is a specification.

The present invention relates to the manufacture of isopropyl ether, and more particularly to its manufacture by the action of sulfuric acid upon isopropyl alcohol.

I have found that the action of sulfuric acid upon isopropyl alcohol causes the decomposition of the latter, with the formation of propylene in varying amounts, the strength of the acid employed being an important factor in determining the extent of decomposition. With concentrated acid substantially no isopropyl ether is formed, the alcohol being decomposed, and the propylene formed polymerized to a greater or less extent.

I have determined that the decomposition of the isopropyl alcohol may be minimized by the use of diluted sulfuric, the strength of which is not above 85%. In practice, the best results are obtained by the use of acid of a strength between 70 and 85%, although weaker acid may be employed, if desired. The proportion of acid to alcohol may vary greatly, since the acid is effective in its reaction upon from 1 to 5 times its volume of alcohol. It is preferred that the reaction be started with from 1 to 2 times the volume of alcohol present, and that if it is desired to carry on the reaction with further quantities of alcohol, that it be added gradually as the reaction progresses. The reacting mixture is heated to boiling point and the isopropyl ether produced passes off, accompanied by propylene and undecomposed isopropyl alcohol. If desired the latter may be refluxed to the reacting mixture. The isopropyl ether is condensed, and the propylene, which is substantially pure, may be absorbed by cold sulfuric acid with the formation of propylene sulfuric acid, which may, if desired, be hydrolyzed to form the alcohol, with which the reaction may be repeated.

The following specific examples are illustrative of the present invention:

*First example.*

83% sulfuric acid is mixed with 1 to 1 1/2 times its volume of 90% isopropyl alcohol, and the mixture heated to 110 to 125° C. The vapors evolved are condensed, and the escaping propylene vapors are reabsorbed in sulfuric acid and kept at a low temperature to avoid polymerization. As the reaction proceeds 2 to 3 volumes of the isopropyl alcohol are slowly added, preferably at a rate to maintain approximately a constant volume of reacting mixture. The yield of isopropyl ether is approximately 40% of theoretical, the decomposition of the alcohol being substantially entirely confined to the formation of the ether and propylene.

*Second example.*

75% sulfuric acid is mixed with 1 1/4 to 1 1/2 times its volume of 90% isopropyl alcohol. The mixture is distilled through a fractionating column. The temperature of the reacting mixture is maintained at 100 to 125° C., and the temperature at the top of the column is maintained somewhat below the boiling point of isopropyl ether, say at 45 to 65° C. The ether is carried over by the gaseous propylene evolved. The ether is condensed and the propylene absorbed in sulfuric acid, say concentrated sulfuric acid at a temperature of 10° C. or lower. The acid extract obtained may be diluted and added directly to the reaction mixture, the proportion of water added being calculated to reduce the sulfuric acid concentration to approximately that of the mixture, or, if desired, it may be hydrolyzed and the alcohol formed added to the reaction mixture.

I claim:

1. The method of manufacturing isopropyl ether which comprises reacting upon isopropyl alcohol with sulfuric acid of a strength below 85%.

2. The method of manufacturing isopropyl ether which comprises reacting upon isopropyl alcohol with sulfuric acid of a strength between 70 and 85%.

3. The method of manufacturing isopropyl ether which comprises subjecting isopropyl alcohol to the action of sulfuric acid of a strength between 70 and 85% and boiling the mixture.

4. The method of manufacturing isopropyl ether which comprises reacting upon isopropyl alcohol with sulfuric acid of a strength between 70 and 85%, separating the evolved isopropyl ether and propylene, absorbing the latter in sulfuric acid as propylene sulfuric acid and returning the latter to the reaction mixture.

5. The method of manufacturing isopropyl ether which comprises heating sulfuric acid of a strength between 70 and 85% with isopropyl alcohol, passing the vapors through a column, the outlet of which is maintained somewhat below the boiling point of isopropyl ether, and separating the escaping vapors into isopropyl ether and propylene.

MATTHEW D. MANN, Jr.